United States Patent [19]

Wollmann et al.

[11] Patent Number: 5,118,722

[45] Date of Patent: Jun. 2, 1992

[54] METHOD OF PRODUCING ELASTIC FOAMS HAVING A BASE OF POLYURETHANE BY MICROWAVE FOAMING

[75] Inventors: Klaus Wollmann, Limburg; Alexander Ach, Frankfurt; Werner Frank, Bergisch-Gladbach, all of Fed. Rep. of Germany

[73] Assignee: Illbruck GmbH, Leverkusen, Fed. Rep. of Germany

[21] Appl. No.: 477,358

[22] Filed: Nov. 27, 1989

[30] Foreign Application Priority Data

Nov. 28, 1988 [DE] Fed. Rep. of Germany ....... 3840079

[51] Int. Cl.⁵ .................... C08L 61/28; C08L 75/04; C08G 12/32
[52] U.S. Cl. ...................................... 521/137; 521/82; 521/120; 521/136; 521/158; 521/159; 521/163; 521/181; 521/187; 521/188
[58] Field of Search ............... 521/137, 120, 163, 159, 521/181, 187, 188, 158, 82, 136

[56] References Cited

U.S. PATENT DOCUMENTS

| | | |
|---|---|---|
| 3,288,894 | 12/1966 | Jacobs .................................. 264/25 |
| 3,294,879 | 11/1966 | Deaton .................................. 264/26 |
| 4,334,971 | 6/1982 | Mahnke et al. ..................... 521/137 |
| 4,367,294 | 1/1983 | Hahn et al. .......................... 521/137 |
| 4,596,835 | 6/1986 | Werner et al. ...................... 521/137 |

FOREIGN PATENT DOCUMENTS 037470 5/1987 European Pat. Off. .
61083009 4/1983 Japan .

OTHER PUBLICATIONS

"Journal of Cellular Plastics, 8/68, Microwave curing of Urethane Foams . . . ", R. Rajon, pp. 304–308.
"Journal of Cellular Plastics 11/12/79, A Rapid Predictive Test for Urethane Foam . . . ", H. J. Regle & B. A. Jacobs, pp. 311–314.

Primary Examiner—John Kight, III
Assistant Examiner—John M. Cooney, Jr.
Attorney, Agent, or Firm—Martin A. Farber

[57] ABSTRACT

A method of producing elastic foam having a base of polyurethane, in particular for use in the field of automobiles for sound damping. Allows production of foam parts directly in a desired shape in as few operations as possible. The foam is formed from a mixture of at least one polyurethane precondensate, at least on melamine precondensate and further additives for the foaming.

15 Claims, No Drawings

METHOD OF PRODUCING ELASTIC FOAMS HAVING A BASE OF POLYURETHANE BY MICROWAVE FOAMING

FIELD AND BACKGROUND OF THE INVENTION

The present invention relates to a method of producing elastic foam having a base of polyurethane particularly useful for damping sound in automobiles by foaming dielectric heating.

In addition, the invention concerns an elastic foam as well as a sound-absorbing composite structural part based on this foam.

The sound-damping and acoustic insulating of the engine compartment of motor vehicles, etc., is acquiring greater and greater importance since noise pollution in the environment and noise directed at the passengers in a motor vehicle should be reduced as much as possible. Sound-damping has up to now been effected technically predominantly by means of hot-shaped parts of soft-foam which are fastened by bonding or mechanical fastening techniques to the body of the car or to supporting plastic parts installed therein. Foams for the damping of sound in the engine compartment should have good acoustic sound-damping action, good mechanical strength, sufficient elasticity and good restoration behavior, low bulk weight, difficult inflammability, chemical resistance to water, oil and gasoline, as well as resistance to temperatures of up to 180° C. It is difficult to satisfy these conditions simultaneously.

Furthermore, the manufacture of the foam parts is effected in numerous individual steps which are expensive in terms of labor, energy and time. In particular, pre-cutting or stamping of the foam parts from a larger block and bonding or mechanical attachment to supporting plastic parts must be effected.

It is therefore endeavored to manufacture the foam parts directly in the desired shape in as few operations as possible. The foaming and hardening process is, however, difficult to carry out in the case of such small foam parts.

The best method for this is foaming under dielectric heating, for instance by microwaves, as described in Federal Republic of Germany patent document No. OS 30 11 769. The monomer mixtures used up to now for the purpose intended here are, however, not suitable for foaming under dielectric heating.

SUMMARY OF THE INVENTION

Starting from this prior art, the object of the present invention is therefore to provide an elastic foam, and a method of manufacturing it, which satisfies the aforementioned requirements and can be produced in the simplest and most advantageous manner possible.

This object is achieved by the invention mixing at least one polyurethane precondensate, at least one melamine precondensate, and further additives to produce a mixture; and foaming the mixture. The elastic foam, soft foam, having a base of polyurethane is produced by foaming under dielectric heating by microwaves.

DETAILED DESCRIPTION OF THE PREFERRED EMBODIMENTS

A mixture of at least one polyurethane precondensate, at least one melamine precondensate, and customary additives is foamed. As melamine/formaldehyde precondensate, there is preferably used one which has been precondensed by acid (water-insoluble precondensate). Suitable melamine precondensates are, for instance, the products sold by ACRIS Feinchemikalien-GmbH of Heidelberg under the trade name CYMEL 303, 301 and MM 100, as well as the products sold by Cassella AG of Frankfurt under the trade name MAPRENAL MF 900 and MADURIT MW 100.

The polyurethane precondensate is prepared from a polyisocyanate and a polyhydroxy compound. The polyhydroxy compound preferably has a molecular weight of 1000 to 3000 and a hydroxyl number of about 30 to 70. Polyethers and, in particular, polyesters having hydroxyl groups are preferably used as polyhydroxy compounds. Suitable polyhydroxy compounds are, in particular, the products sold by Bayer AG of Leverkusen under the trade name DESMOPHEN 550 U, 1900, 2000, 2200 and under the trade name BAYTHERM 4011 T AND 4012 R. The product sold by BASF AG of Ludwigshafen under the trade name LUPRANOL 2000 as well as the product sold by Ernst Jäger of Düsseldorf under the trade name JÄGERPOL HP44 are also suitable.

As polyisocyanates, all polyisocyanates customary in this field enter into question. Particularly suitable polyisocyanates are 2,4- and 2,6-toluylene-diisocyanate, naphthaline-1,5-diisocyanate, diphenylmethane-4,4'-diisocyanate, 1,6-hexamethylene diisocyanate, trimethyl-hexamethylene diisocyanate or isophorondiisocyanate or mixtures thereof.

Suitable polyisocyanates are, for instance, the products sold by Bayer AG of Leverkusen under the trade name DESMODUR E14, E21, E22, E41, T80 and MDI.

The polyurethane precondensates are prepared in customary manner so that 25 - 75% free hydroxyl groups are obtained. The melamine precondensate is also produced in customary fashion.

For the production of the foams of the invention, polyurethane precondensates and the melamine precondensates are mixed and foamed with the addition of various additives. Such additives are small amounts of water (1 to 5 wy.% referred to the total weight of the mixture to be foamed) as absorbent of the electrical energy and expanding agents emulsifiers and stabilizers. It is particularly preferred to use protein fatty-acid condensates since they act both as expanding agent and as emulsifiers. Therefore the amount of water to be added can be reduced so that, despite the reactive initial components, sufficient time remains for thorough mixing and homogenizing before the actual foaming process.

Suitable emulsifiers are the products sold by Borchers AG of Goslar under the trade name BORCHIGEN STL and, in particular, the products sold by DGF Stoess & Co. of Eberbach under the trade name EFK 3000 and EFK 500 (protein fatty acid concentrate).

Suitable stabilizers are the products sold by Goldschmidt AG of Essen under the trade name TEGOSTAB B8404, BF 2370 and B 4113.

As auxiliary expansion agent, Frigen 113 produced by Höchst AG of Frankfurt is, for instance, suitable.

Other customary additives are catalysts such as the products sold by Bayer AG of Leverkusen under the trade name DESMORAPID DP, by Air Products of Utrecht under the trade name DABCO LK 221, and by the Texaco Chemical Co. of Cologne under the trade name JEFFAMIN DU 700, ED 600 and BUD 2000, as well as toluene sulfonic acid and dibutyl tin laurate.

Other suitable additives are the products of Rütgers, Werken of Meidrich sold under the trade name Härter (Hardener) SL, and by Union Carbide of Wiesbaden under the trade name SILIKON M20.

Polyurethane precondensate and melamine precondensate can be used in any ratio from 1:4 to 10:1, and preferably 3:3 to 10:1, parts by weight. The protein fatty-acid concentrate is preferably added in an amount of 0.1% to 5%.

The mixture intended for foaming is in the form of a paste having a viscosity of 1 to 5000 cPas. It is introduced into a suitable mold in such a manner that the bottom of the mold is covered. The foaming is effected in an ordinary microwave oven such as described, for instance, in Federal Republic of German patent document No. OS 30 11 769. The foaming is preferably carried out for 1 to 5 minutes at a power of a maximum 700 watts. After removal of the foamed body from the oven, it is allowed to cool and harden for a few minutes, preferably 1 to 10 minutes, at 50° C. to b 100° C.

The foams obtainable in accordance with the invention have the following properties: they are fine-pored, homogenous, mechanically resistant, elastic, and have bulk weights of 30 to 500 kilograms per cubic meter. Furthermore, they have low-temperature flexibility and resistance to heat. Due to the simultaneous use of the melamine resin, the foams furthermore have high flame resistance. The compression stress value is about 2 to 5 kPa (40% value in accordance with DIN 53577), the tensile strength 150 to 200 kPa (DIN 53571), and the elongation upon rupture about 150 to 300%.

The foams can be used for the heatproofing and soundproofing of buildings and parts of buildings, containers and the like, and, in particular, for the heatproofing and soundproofing of automobiles and airplanes.

The following example serves to explain the invention:

EXAMPLE

Polyurethane precondensate is prepared by adding 10.20 grams of polyol (Desmophen 4011 T) to 3.37 grams of diisocyanate (MDI) and stirring for 8 hours at room temperature.

A melamine precondensate is also prepared by stirring 20 grams of melamine resin (Cymel 303) with 0.5 toluene sulfonic acid for 30 minutes at 80° C.

4 grams of the polyurethane precondensate and 10 grams of the melamine precondensate are mixed and treated with 6 grams of polyol (Desmophen 550 U), 16.5 grams of polyisocyanate (Desmodur E21), 0.6 grams of stabilizer (Tegostab 2370), 0.4 grams of emulsifier (EFK3000), and 2 grams of water. The mixture is introduced into a mold and foamed in a microwave oven (700 watts). The foaming process takes two minutes with reduced application of energy. The foamed body is removed from the oven and allowed to cool and harden for a few minutes.

The foam obtained is homogeneous, fine-pored, elastic, and has a bulk weight of 100 kilograms per cm$^3$.

We claim:

1. A method of producing elastic foam having a base of polyurethane suitable for use in automobiles for acoustic insulation, by foaming a polyisocyanate and a polyalcohol under dielectric heating, the method comprising
   mixing at least one polyurethane precondensate, at least one water-insoluble melamine formaldehyde precondensate, a protein/fatty-acid concentrate which acts as foaming agent and emulsifier, and further additives to produce a mixture; and
   foaming the mixture.

2. A method according to claim 1, wherein
   said polymethane precondensate is a linear polyurethane precondensate having 5 to 10% free isocyanate groups.

3. A method according to claim 2, wherein
   the mixing step employs also linear polyisocyanate precondensates having 5 to 10% free isocyanate groups.

4. A method according to claim 1, wherein
   the mixing step employs also linear polyisocyanate precondensates having 5 to 10% free isocyanate groups.

5. A method according to claim 1, wherein
   the mixing step employs a polyurethane precondensate which has been obtained from a polyhydroxy compound having a molecular weight of 1000 to 3000 and a hydroxyl number of 30 to 70.

6. A method according to claim 4, wherein
   as polyisocyanate there is used 2,4- and 2,6-toluylenediisocyanate, naphthaline-1,5-diisocyanate, diphenylmethane-4,4'-diisocyanate, 1,6-hexamethylene diisocyanate, trimethylhexamethylene diisocyanate or isophorondiisocyanate, individually or in mixture.

7. A method according to claim 6, wherein
   a polyester or polyether glycol is used as polyhydroxy compound.

8. A method according to claim 5, wherein
   a polyester or polyether glycol is used as polyhydroxy compound.

9. A method according to claim 1, wherein
   the foaming is effected for about 1 to 20 minutes in a microwave oven.

10. A method according to claim 1, further comprising
    a step of subsequent hardening of the mixture for about 1 to 10 minutes at 50° C. to 100° C.

11. An elastic foam comprising a foamed mixture of at least one polyurethane precondensate, at least one water-insoluble melamine formaldehyde precondensate, and further additives.

12. A foam according to claim 11, wherein
    said further additives comprise an emulsifier.

13. A foam according to claim 11, wherein
    said further additives comprise a stabilizer.

14. A foam according to claim 13, wherein
    said further additives comprise an expansion agent.

15. A sound-damping composite structural part, suitable for use in an automobile, comprising
    a foamed mixture of at least one polyurethane precondensate, at least one water-insoluble melamine formaldehyde precondensate, and further additives; and
    a plastic supporting part for supporting the foam.

* * * * *